(12) United States Patent
Kowalski

(10) Patent No.: US 8,068,551 B2
(45) Date of Patent: Nov. 29, 2011

(54) SYSTEMS AND METHODS FOR DESIGNING A REFERENCE SIGNAL TO BE TRANSMITTED IN A MULTIPLEXED CELLULAR SYSTEM

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 579 days.

(21) Appl. No.: 11/851,077

(22) Filed: Sep. 6, 2007

(65) Prior Publication Data
US 2009/0067318 A1    Mar. 12, 2009

(51) Int. Cl.
H04B 7/02 (2006.01)
H04L 1/02 (2006.01)

(52) U.S. Cl. ........ 375/267; 375/299; 375/347; 370/334; 455/101

(58) Field of Classification Search .......... 375/267, 375/299, 347; 455/101; 370/334
See application file for complete search history.

(56) References Cited

U.S. PATENT DOCUMENTS

| 7,145,940 | B2  | 12/2006 | Gore et al. |
| 7,170,926 | B2  | 1/2007  | Zeira |
| 7,173,899 | B1  | 2/2007  | Rupp |
| 7,173,973 | B2  | 2/2007  | Borran et al. |
| 7,539,263 | B2* | 5/2009  | Jung et al. ...................... 375/267 |
| 7,848,448 | B2  | 12/2010 | Han et al. |
| 2008/0075184 | A1  | 3/2008  | Muharemovic et al. |
| 2008/0225688 | A1* | 9/2008  | Kowalski ...................... 370/203 |
| 2008/0232300 | A1  | 9/2008  | McCoy et al. |
| 2008/0235314 | A1  | 9/2008  | Lee et al. |
| 2009/0046629 | A1  | 2/2009  | Jiang et al. |
| 2009/0110034 | A1  | 4/2009  | Kowalski |
| 2010/0097922 | A1  | 4/2010  | Kowalski |
| 2010/0177834 | A1  | 7/2010  | Kowalski |
| 2010/0290546 | A1  | 11/2010 | Kowalski |

FOREIGN PATENT DOCUMENTS

| CA | 2 611 157 A1 | 12/2006 |
| EP | 1 898 542 A1 | 3/2008 |
| JP | 2006-295629 | 10/2006 |
| WO | 2006/134949 | 12/2006 |

OTHER PUBLICATIONS

Sharp, "UL RS via OZCL Sequences," R1-072719, Jun. 2007.
Sharp, "Summary Results on OZCL Sequences for UL RS for LTE," R1-073319, Aug. 2007.
Texas Instruments, "Design of CAZAC Sequences for Small RB Allocations in E-UTRA UL," 3GPP RAN 1, May 2007.
Motorola, "UL RS Generation for E-UTRA," R1-073754, Aug. 2007.

(Continued)

*Primary Examiner* — Ted M Wang
(74) *Attorney, Agent, or Firm* — Austin Rapp & Hardman

(57) ABSTRACT

A method for designing a reference signal to be transmitted in a multiplexed cellular system is described. A first set of matrices that comprises a plurality of matrices is selected. An optimal partition of the first set of matrices is determined. A third matrix is formed. The third matrix represents a cross-correlation of a second matrix and each of the plurality of first matrices. A minimum corresponding to the first set of matrices is set. The second matrix is updated using the minimum corresponding to the first set of matrices. Each column of the second matrix is scaled by a first value.

21 Claims, 8 Drawing Sheets

OTHER PUBLICATIONS

Y. Linde, A. Buzo, and R.M. Gray, "An Algorithm for Vector Quantizer Design," IEEE Trans. Commun. vol. Com-28, No. 1, Jan. 1980, pp. 84-98.

P. Xia, S. Zhou, G. Giannakis, "Achieving the Welch Bound with Different Sets," IEEE Trans. Information Theory, vol. 51, No. 5. May 2005, pp. 1900-1907.

J.A. Troop, I.S. Dhillon, and R.W. Heath Jr., "Designing Structured Tight Frames Via an Alternating Projection Method," IEEE Trans. Information Theory, vol. 51, No. 1, Jan. 2005, pp. 188-209.

U.S. Appl. No. 11/686,251, filed Mar. 14, 2007, Kowalski.
U.S. Appl. No. 11/928,092, filed Oct. 30, 2007, Kowalski.
U.S. Appl. No. 12/530,742, filed Sep. 10, 2009, Kowalski.
U.S. Appl. No. 12/530,761, filed Sep. 10, 2009, Kowalski.

International Search Report issued for International Patent Application No. PCT/JP2008/066481 on Dec. 22, 2008.

Sharp, "Summary Results on OZCL Sequences for UL RS for LTE," 3GPP TSG-RAN WG1 #50, R1-073319, Aug. 2007.

Sharp, "Optimized UL RS Design—OZCL Sequences," 3GPP TSG-RAN WG1 #48bis, R1-072053, May 2007.

J. Coon et al., "Optimal Training Sequences for Channel Estimation in Cyclic-Prefix-Based Single-Carrier Systems with Transmit Diversity," IEEE Signal Processing Letters, vol. 11, No. 9, Sep. 2004, pp. 729-732.

L.R. Welch, "Lower Bounds on the Maximum Cross-Correlation of Signals," IEEE Transactions on Information Theory, vol. IT-20, No. 3, May 1974, pp. 397-399.

B. Popovic, "Generalized Chirp-Like Polyphase Sequences with Optimum Correlation Properties," IEEE Transactions on Information Theory, vol. 38, No. 4, Jul. 1992, pp. 1406-1409.

S. Boyd and L. Vandenberghe, "Convex Optimization", 2004, p. 634, Cambridge University Press, Cambridge.

R.M. Gray, "Toeplitz and Circulant Matrices: A Review," http://ee.stanford.edu/~gray/toeplitz.pdf, Jun. 28, 2007.

Motorola, "Uplink Reference Signal Generation Methods," 3GPP RAN WG1 #47bis, R1-070152, Jan. 2007.

NEC Group, "Citeria to decide Zadoff-Chu sequence length for EUTRA uplink reference signal," 3GPP TSG RAN WG1 Meeting #48, R1-070877, Feb. 2007.

Motorola, "Cubic Metric in 3GPP-LTE," 3GPP TSG RAN WG1 LTE Adhoc, R1-060023, Jan. 2006.

Motorola, "Proposal for UL DM RS for 1 and 2 RB Allocation," 3GPP TSG RAN1 Email Reflector, Sep. 2007.

Qualcomm Europe, "Uplink RS for Small Resource Block Allocation," 3GPP TSG RAN1 #50, R1-07xxxx, Aug. 2007.

Texas Instruments, "Design of CG Sequences for Small RB Allocations in E-UTRA UL," 3GPP TSG RAN WG1 #50bis, R1-07abcd, Oct. 2007.

Texas Instruments, "Design of CAZAC Sequences for Small RB Allocations in E-UTRA UL," 3GPP RAN WG1 #49bis, R1-072848, Jun. 2007.

Motorola, "UL RS Generation for E-UTRA," 3GPP RAN WG1 #50, R1-073754, Aug. 2007.

International Search Report issued for International Patent Application No. PCT/JP2008/055157 on May 20, 2008.

Written Opinion issued for International Patent Application No. PCT/JP2008/055157 on May 20, 2008.

International Search Report issued for International Patent Application No. PCT/JP2008/055154 on Jun. 24, 2008.

Written Opinion issued for International Patent Application No. PCT/JP2008/055154 on Jun. 24, 2008.

U.S. Appl. No. 12/676,485, filed Jun. 3, 2010, Kowalski.

Texas Instruments, "Design of CAZAC Sequences for Small RB Allocations in E-UTRA UL," 3GPP TSG RAN WG1 #49, R1-072206, May 2007.

Office Action issued for U.S. Appl. No. 11/928,092 on Mar. 4, 2011.

Notice of Acceptance issued for Australian Patent Application No. 2008227399 on May 2, 2011.

* cited by examiner

SYSTEMS AND METHODS FOR DESIGNING A REFERENCE SIGNAL TO BE TRANSMITTED IN A MULTIPLEXED CELLULAR SYSTEM

TECHNICAL FIELD

The present invention relates generally to communications and wireless communications related technology. More specifically, the present invention relates to systems and methods that improve the design of reference signals for spatially multiplexed cellular systems.

BACKGROUND

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multi-tone transmission (DMT).

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), Orthogonal Frequency-Division Multiplexing (OFDM)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmits a reference signal. The reference signals for 3GPP may be generated by computer algorithms, however, the particular algorithms and their criteria for effectiveness are not specified. As such, benefits may be realized by providing systems and methods for improving the design of reference signals for spatially multiplexed cellular systems.

DETAILED DESCRIPTION

Figure 1:
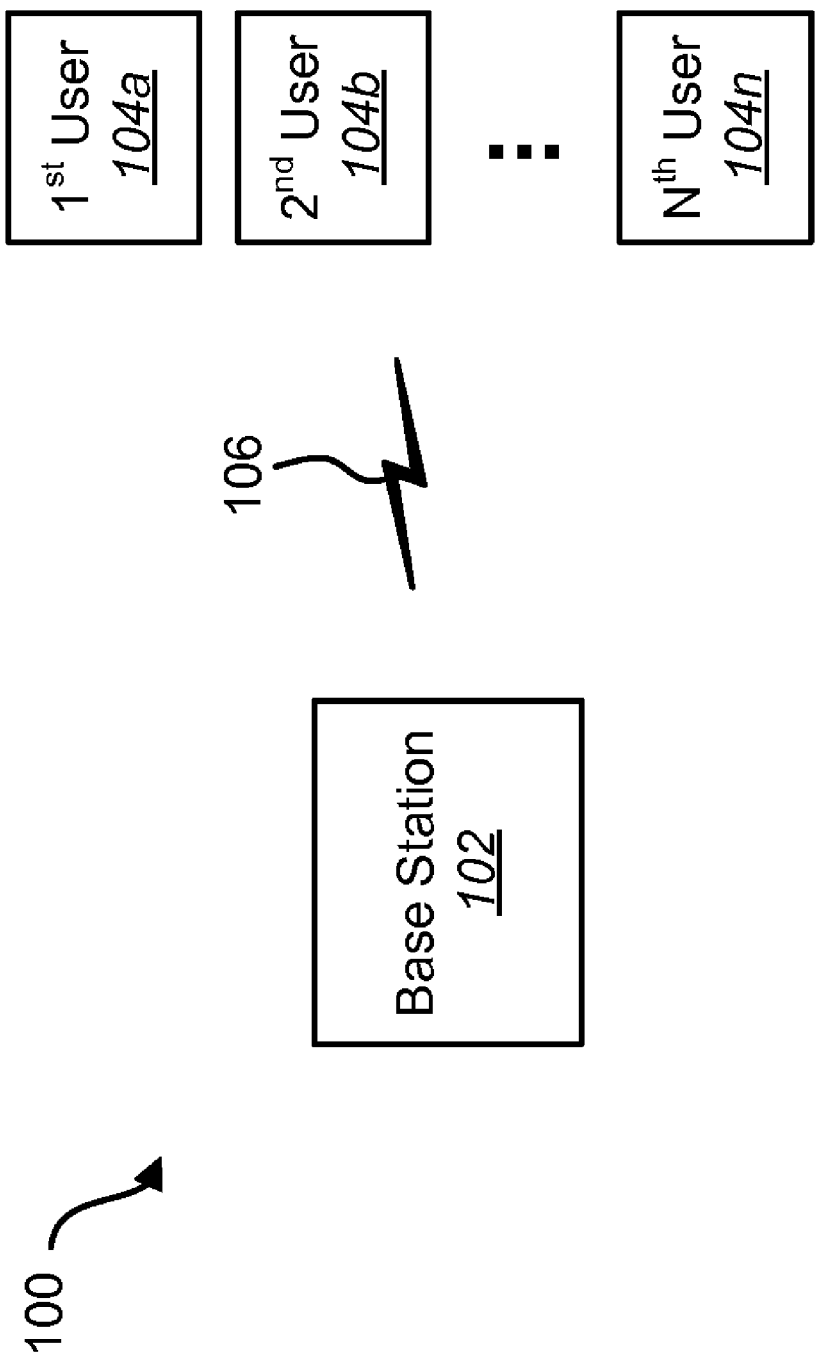
FIG. 1 illustrates an exemplary wireless communication system in which embodiments may be practiced.

A method for designing a reference signal to be transmitted in a multiplexed cellular system is described. A first set of matrices that comprises a plurality of matrices is selected. An optimal partition of the first set of matrices is determined. A third matrix is formed. The third matrix represents a cross-correlation of a second matrix and each of the plurality of first matrices. A minimum corresponding to the first set of matrices is set. The second matrix is updated using the minimum corresponding to the first set of matrices. Each column of the second matrix is scaled by a first value.

A complex conjugation of the second matrix may be computed. A function from each column of the second matrix may also be computed. In one embodiment, a complex conjugation of the function is obtained with minimum Peak to Average Power Ratio (PAPR). The complex conjugation of the function may be mapped to a first vector associated with the second matrix. A second vector nearest to the first vector may be computed with minimum PAPR in the frequency domain.

In one embodiment, clustering algorithms are used to minimize cross-correlation for matrices comprising sub-matrices of Constant Amplitude Zero Autocorrelation (CAZAC) sequences. A matrix metric based on a magnitude of a normalized cross-correlation may also be used. Initial conditions that are based on the Frobenius norm of d×d sub-matrices of the Gram matrix of a set of initial blocks of sequences may be used.

An initial representation of a set of sequences may be determined which can be sub-divided into subsets. The subsets may be CAZAC sequences. The initial conditions are used to design a set of reference signals for transmission of uplink demodulation reference signals. Initial conditions may also be used that are based on choosing a series of random subsets of a training set and choosing the initial set of matrices from the series of random subsets that has minimum average cross-correlation. In one embodiment, PAPR is optimized in time and frequency domains. Each column of the second matrix may be scaled by its Euclidean norm.

A communications device that is configured to design a reference signal to be transmitted in a multiplexed cellular system is also described. The communications device includes a processor and memory in electronic communication with the processor. Instructions are stored in the memory. A first set of matrices that comprises a plurality of matrices is selected. An optimal partition of the first set of matrices is determined. A third matrix is formed. The third matrix represents a cross-correlation of a second matrix and each of the plurality of first matrices. A minimum corresponding to the first set of matrices is set. The second matrix is updated using the minimum corresponding to the first set of matrices. Each column of the second matrix is scaled by a first value.

A computer-readable medium comprising executable instructions is also described. A first set of matrices that comprises a plurality of matrices is selected. An optimal partition of the first set of matrices is determined. A third matrix is formed. The third matrix represents a cross-correlation of a second matrix and each of the plurality of first matrices. A minimum corresponding to the first set of matrices is set. The second matrix is updated using the minimum corresponding to the first set of matrices. Each column of the second matrix is scaled by a first value.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Reference signals for 3GPP may, for certain allocations of time and frequency, be generated by computer algorithms. However, the particular algorithms and their criteria for effectiveness are not specified in current standards. The present systems and methods may implement an algorithm for the design of a set of reference signal sequences from another group of reference signal sequences such that the maximum, as well as the average cross-correlation of sequences may be minimized. Furthermore the algorithm implemented in the present systems and methods ensures that the sequences so designed have minimum Peak to Average Power Ratio in both the time and frequency domains.

The algorithm implemented herein may be utilized to design uplink reference signals in a cellular system, since this poses the most stringent requirements on time and frequency resources. The systems that implement the algorithm may include a single or multiple carrier modulation with a cyclic prefix, where there exists synchronization between the transmission of multiple uplink signals and their respective base stations and where sectorization amongst cells is employed to maximize the capacity per cell. In addition, the systems may employ multiple bandwidth allocations simultaneously, where each bandwidth so allocated to a mobile terminal may be an integer amount of some basic unit.

In such a system as described above that implements the algorithm of the present systems and methods, the set of reference signals should be large enough to cover at least three sectors per cell, with at least two reference signals per sector. In one embodiment, four reference signals per cell are used. In addition, the set of reference signals should be orthogonal in each sector of a given cell and in all sectors adjacent to a given sector. If this is orthogonality is achieved, then it may be possible, if reference signals are known to adjacent sectors, to design a best minimum mean square receiver. For those reference signals not in adjacent sectors, or which are not orthogonal, they should be minimally correlated, with approximately the same correlation.

The set of reference signals should have Peak to Average Power Ratio (PAPR) approaching, if not equal to one, where the PAPR is defined for a sequence vector c as:

$$\mathcal{P} = \frac{\|c\|_\infty^2}{c^H c} \qquad \text{Equation (1)}$$

where $\|c\|_\infty^2$ denotes the square maximum modulus component of c and where $(\ )^H$ denotes a conjugate transpose. In addition, it may be desirable that Discrete Fourier Transforms of sequences are easily computable. As such, it is desirable that amongst subsets of sequences with orthogonal elements, that each element be a cyclic shift of another element. This may also provide a robust performance if a transmission system which transmits a cyclic prefix for multi-path elimination encounters multi-path components with delay spread greater than the cyclic prefix length, as in such cases cyclic shifts, if scaled large enough, may still be distinguishable.

Furthermore, in a system where the reference signal sequences are also used as covering modulations for transmissions of acknowledgment (ACK), it may be desired that the number of reference signal sequences be as large as possible. Finally, as these sequences are for Multiple Input Multiple Output (MIMO) applications, subsets of the sequences derived should be Constant Amplitude Zero (cyclic) Autocorrelation (CAZAC) sequences.

Current solutions rely on either frame generation algorithms or frame generation is achieved via random CAZAC sequence generation methods. However, the current solutions do not provide a method to effectively reduce the peak cross-correlation of sequences. The present systems and methods implement clustering algorithms for the design of reference signals for spatially multiplexed cellular systems.

In one embodiment, the present systems and methods implement the use of clustering algorithms based on an algorithm for vector quantizer design to minimize cross-correlation for matrices composed of sub-matrices of CAZAC sequences. An example of this algorithm may be found in "Y. Linde, A. Buzo, and R. M. Gray, 'An Algorithm for Vector Quantizer Design,' IEEE Trans. Commun. Vol. Com-28, No. 1, January 1980, pp. 84-98." In addition, the present systems and methods described the use of matrix metric based on the magnitude and the normalized cross-correlation. The present systems and methods further describe the combination of the clustering algorithm with the PAPR reduction algorithms. Examples of the PAPR reduction algorithms may be found in U.S. application Ser. No. 11/686,251 titled "Systems and methods for improving reference signals for spatially multiplexed cellular system" and "J. A. Tropp, I. S. Dhillon, and R. W. Heath Jr., 'Designing Structured Tight Frames Via an Alternating Projection Method,' *IEEE Trans. Information Theory*, VOL. 51, No. 1, January 2005, pp. 188-209."

The algorithm of the present systems and methods further includes the use of initial conditions relying on the Frobenius norm of d×d submatrices of a Gram matrix of a set of initial blocks of sequences to determine a good initial representation of a set of sequences which can be sub-divided into subsets which are CAZAC sequences. These initial conditions may further be implemented to describe a set of reference signals for transmission of uplink demodulation reference signals.

FIG. 1 illustrates an exemplary wireless communication system 100 in which embodiments of the present systems and methods may be practiced. A base station 102 is in wireless communication with a plurality of user devices 104 (which may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
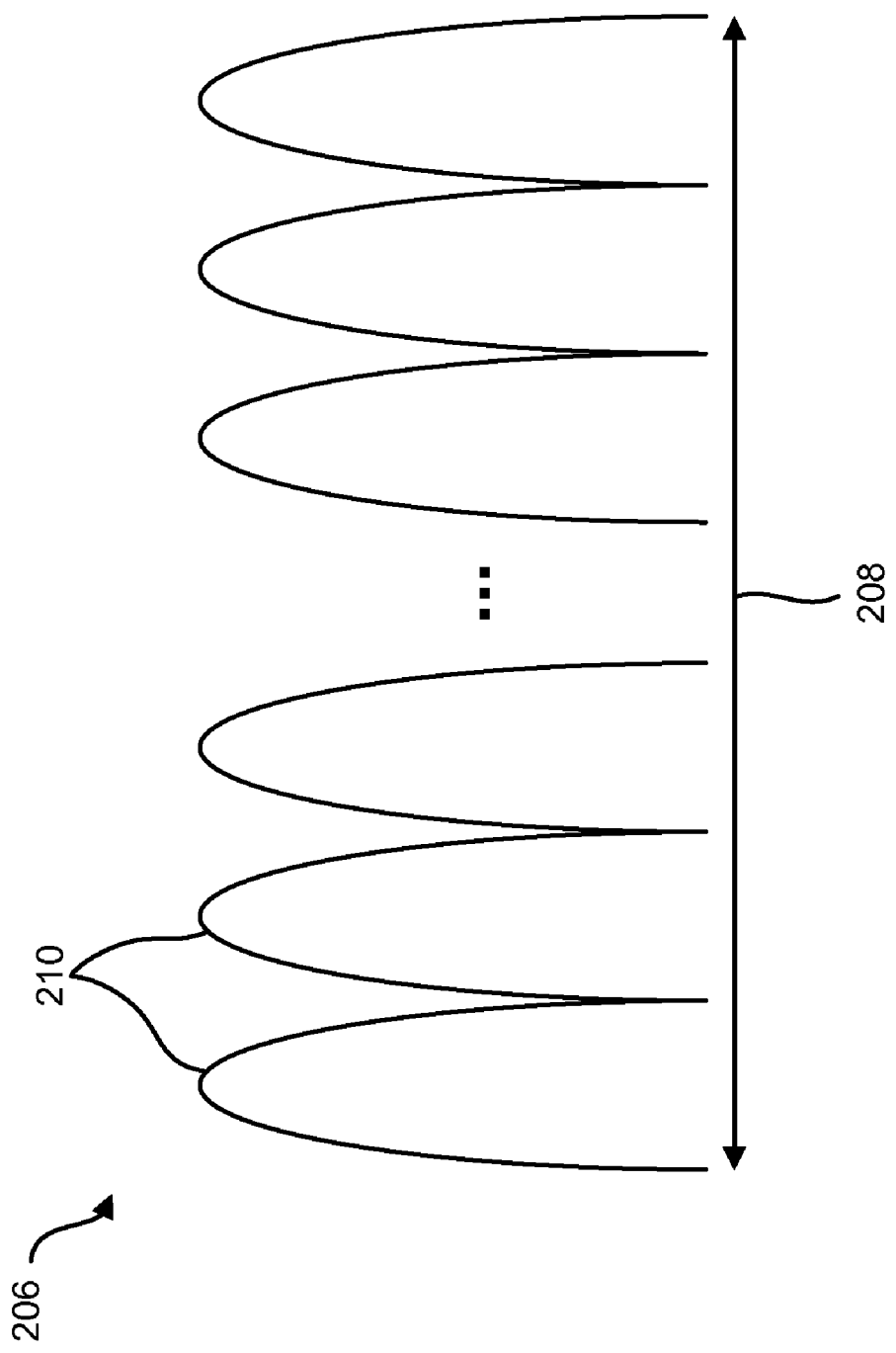
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
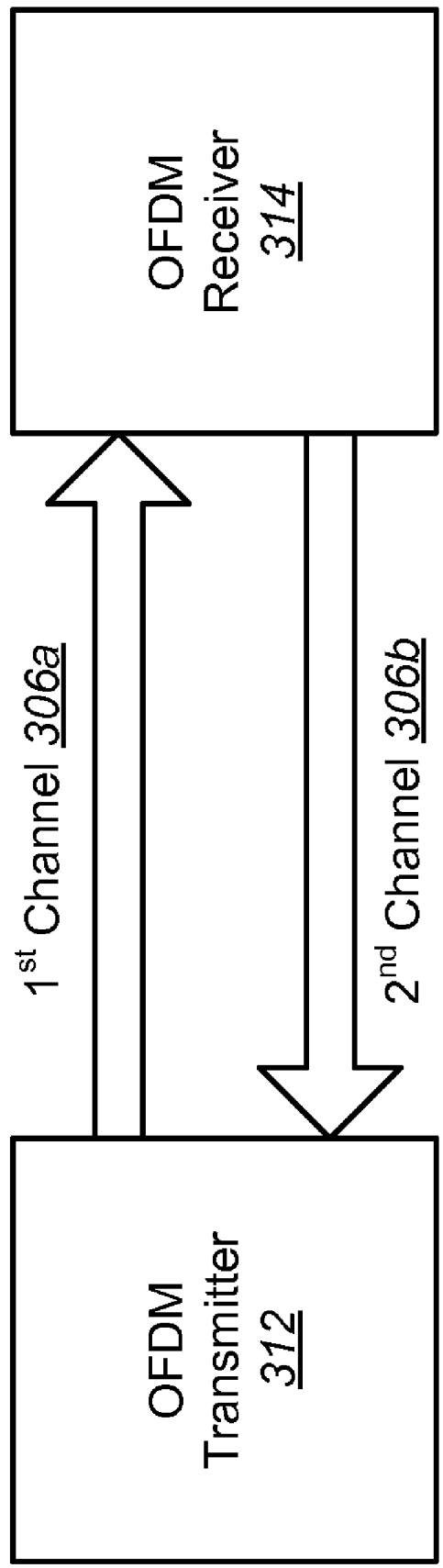
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

In addition, the present systems and methods may be implemented with any modulation that utilizes multiple antennas/MIMO transmissions. For example, the present systems and methods may be implemented for MIMO Code Division Multiple Access (CDMA) systems or Time Division Multiple Access (TDMA) systems.

Figure 4:
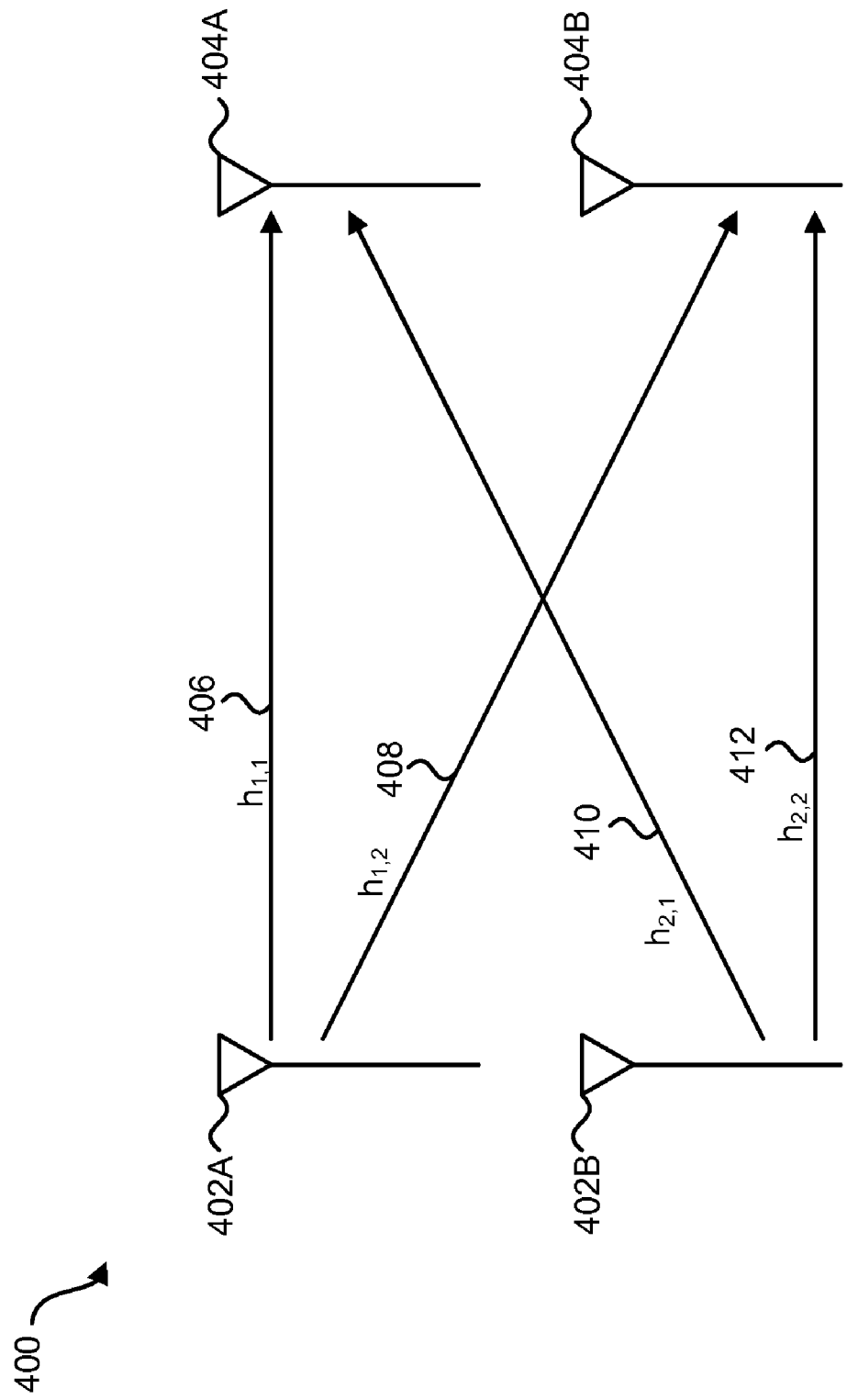
FIG. 4 illustrates one embodiment of a MIMO system that may be implemented with the present systems and methods.

FIG. 4 illustrates one embodiment of a MIMO system 400 that may be implemented with the present systems and methods. The illustrated MIMO system 400 includes a first transmit antenna ($Tx_1$) 402A and a second transmit antenna ($Tx_2$) 402B. The system 400 also includes a first receive antenna ($Rx_1$) 404A and a second receive antenna ($Rx_2$) 404B. The transmit antennas 402A, 402B may be used to transmit a signal 406, 408, 410, 412 to the receive antennas 404A, 404B.

In single antenna systems, multi-path propagation may be detrimental to the performance of the system. The multiple propagation paths may cause "copies" of a signal to arrive at a receiver at slightly different times. These time delayed signals may then become interference when trying to recover the signal of interest. The MIMO system 400 is designed to exploit the multi-path propagation to obtain a performance improvement. For example, the first receive antenna ($Rx_1$) 404A may receive a mixture of a first signal 406 and a third signal 410 which are sent from the first transmit antenna ($Tx_1$) 402A and the second transmit antenna ($Tx_2$) 402B. The first and third signals 406, 410 may be sent over a first channel $h_{1,1}$ and a second third channel $h_{2,1}$. The proportion of the first and third signals that is received at the first receive antenna ($Rx_1$) 404A depends on the transmission channels $h_{1,1}$, $h_{2,1}$. A simplified equation for the signal received at the first receive antenna ($Rx_1$) 404A may be:

$$Rx_1 = (h_{1,1} \times Tx_1) + (h_{2,1} \times Tx_2) \quad \text{(Equation 2)}$$

The first receive antenna ($Rx_1$) 404A receives a combination of what was transmitted from the first and second transmit antennas 402A, 402B. The MIMO system 400 may implement various coding schemes that define which signal 406, 408, 410, 412 should be transmitted, and at what times, to enable an original signal to be recovered when it is received in combination with another signal. These coding schemes may be known as "space-time" codes because they define a code across space (antennas) and time (symbols).

Figure 5:
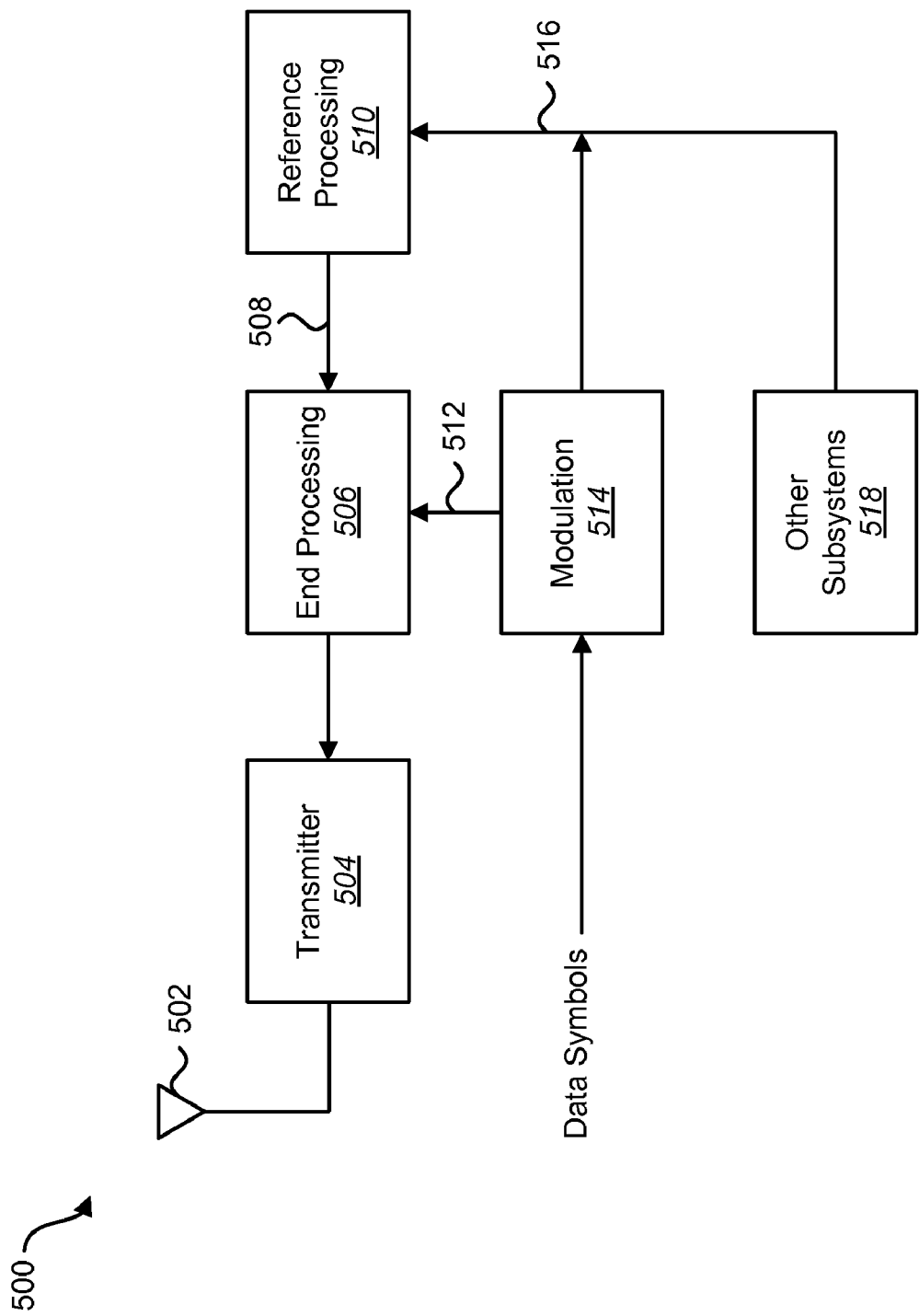
FIG. 5 illustrates a block diagram of certain components in an embodiment of a transmitter.

FIG. 5 illustrates a block diagram 500 of certain components in an embodiment of a transmitter 504. Other components that are typically included in the transmitter 504 may not be illustrated for the purpose of focusing on the novel features of the embodiments herein.

Data symbols may be modulated by a modulation component 514. The modulated data symbols may be analyzed by other subsystems 518. The analyzed data symbols 516 may be provided to a reference processing component 510. The reference processing component 510 may generate a reference signal that may be transmitted with the data symbols. The modulated data symbols 512 and the reference signal 508 may be communicated to an end processing component 506. The end processing component 506 may combine the reference signal 508 and the modulated data symbols 512 into a signal. The transmitter 504 may receive the signal and transmit the signal to a receiver through an antenna 502.

As previously stated, the present systems and methods implement clustering algorithms for the design of reference signals for spatially multiplexed cellular systems. A possible problem statement and clustering algorithm solution is provided below.

A set of matrices $Y = [Y_1\ Y_2\ \ldots\ Y_M]$ may be defined. This set may be referred to as a training set. Each matrix may be d×d. A set of matrices $W = [W_1\ W_2\ \ldots\ W_N]$, N<M, with each matrix in W, also d×d such that it "best represents" Y is desired. In one embodiment, a distortion measure for d×d matrices $A = [a_1\ a_2\ \ldots\ a_d]$ and $B = [b_1\ b_2\ \ldots\ b_d]$ may be defined as:

$$d(A, B) \equiv d^2 - \sum_{i=1}^{d}\sum_{j=1}^{d} |b_i^H a_j| \quad \text{Equation (3)}$$

With this distortion measure as defined in Equation (3), W may be sought such that:

$$W = \underset{V=[V_1 \ V_2 \ \cdots \ V_N]\in C^{d\times dN}}{\operatorname{argmin}} \underset{V_k\in[V_1 \ V_2 \ \cdots \ V_N]}{\min} d(V_k, Y_j) \qquad \text{Equation (4)}$$

for all $Y_j \in [Y_1 \ Y_2 \ldots Y_M]$.

For each $Y_j \in [Y_1 \ Y_2 \ldots Y_M]$ there may be a $W_r$ that has a minimum (or infimum) distortion measure d( ) compared to all other $W_n$ in W. Thus, the optimum W will minimize as well as:

$$d(Y, W) = \sum_{i=1}^{M} d(Y_i, W_{min}(Y_i)) \qquad \text{Equation (5)}$$

where $$W_{min}(Y_i) = \underset{W_k\in[W_1 \ W_2 \ \cdots \ W_N]}{\operatorname{argmin}} d(W_k, Y_i) \qquad \text{Equation (6)}$$

This distortion measure provided above minimizes the cross-correlation for all sequence members. Appropriate modification to the equation:

$$d(A, B) \equiv d^2 - \sum_{i=1}^{d}\sum_{j=1}^{d} |b_i^H a_j| \qquad \text{Equation (7)}$$

may be used to obtain other matrices.

In one embodiment, multiple iterations of two steps may be adapted for the problem described above. The first step may include creating an optimal partition of Y. In this step, for each $Y_i$ the nearest neighbor may be found according to:

$$W_{min}(Y_i) = \underset{W_k\in[W_1 \ W_2 \ \cdots \ W_N]}{\operatorname{argmin}} d(W_k, Y_i) \qquad \text{Equation (8)}$$

The association of multiple $Y_i$ partitions the set Y (in the unlikely event that there are multiple matrices such that $d(W_k, Y_i)$ is minimized, the matrices may be arbitrarily or randomly chosen). This partition may be written as:

$$Y = \bigcup_{k=1}^{N} \mathcal{P}_k(Y, W_k) \qquad \text{Equation (9)}$$

where $\mathcal{P}_k(Y, W_k)$=the set of all $Y_i \in Y$ such that $d(W_k, Y_i)$ is minimized over all $[W_1 \ W_2 \ldots W_N]$. Thus $\mathcal{P}_k(Y, W_k)$ may partition Y into disjoint subsets. In one embodiment, null subsets do not occur is an initial set of matrices is selected from the training set itself.

The second step may include finding the best representative of a set of elements (a subset of the partition). If Euclidean metrics are used, the centroid of the vectors in a partition is used to create the new best representative of each matrix from Y in each subset of the partition. However, as stated above, the metric of the present systems and methods is different. As such, the best representative in each matrix of Y may be found in the sense of minimizing the metric provided above as Equation (7). This implies that the best representative should be maximally correlated with each matrix in each partition. This may be achieved with the following methods described below.

Figure 6:
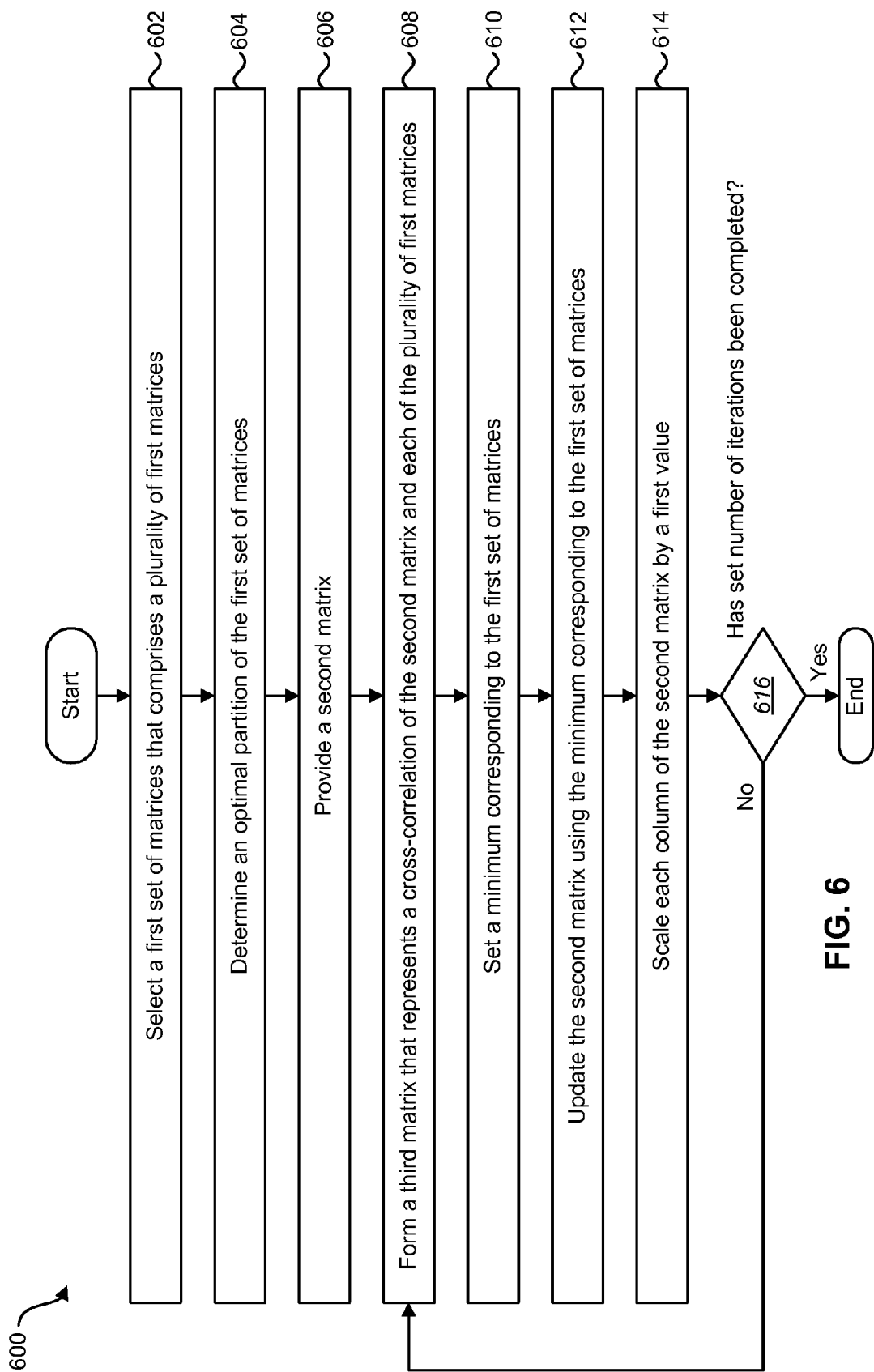
FIG. 6 is a flow diagram illustrating one embodiment of a method for designing a reference signal in a MIMO system.

FIG. 6 is a flow diagram 600 illustrating one embodiment of a method 600 for designing a reference signal to be transmitted in a multiplexed cellular system. In one embodiment, a first set of matrices that includes a plurality of matrices is selected 602. An optimal partition of the first set of matrices is determined 604. A second matrix may also be provided 606. In one embodiment, a third matrix if formed 608. The third matrix may represent a cross-correlation of the second matrix and each of the plurality of first matrices. A minimum corresponding to the first set of matrices may be set 610. The second matrix may be updated 612 using the minimum corresponding to the first set of matrices. Each column of the second matrix may be scaled 614 by a first value. In one embodiment, the first value is the Euclidean norm of the second matrix. A determination 616 may be made whether a set number of iterations have been completed. If the set number of iterations have not been completed, the method 600 performs steps 608-614 until the under of iterations has been completed. A detailed description of the algorithm described in the method 600 is provided below.

The algorithm provided below may be implemented to find a matrix maximally correlated to a set of given matrices. First, a vector algorithm for finding a vector maximally correlated to a set of vectors is provided. A set of given vectors $X=[x_1 \ x_2 \ldots x_N]$, may be provided where each $x_n$ is a vector of length d. In one embodiment, the vector algorithm starts from a $$v_0 = \frac{1}{N}\sum_{n=1}^{N} x_n,$$

the mean of the vectors in question, and a number of iterations, T. Further, the constants $\alpha$ and $\delta$ may be defined, such that $0<\delta\ll 1$, and $0<\alpha<1$.

For t=1:T, the vector $\gamma=v_0^H X$ may be formed, which represents the cross-correlation of $v_0$ with each $x_n$. The minimum absolute value (or absolute value squared) of $\gamma$, $\rightarrow\gamma_{MIN}$ and the minimum vector $x_k \rightarrow x_{MIN}$ that corresponds to the index; i.e. for k such that $\gamma(k)=\gamma_{MIN}$ assign $x_k \rightarrow x_{MIN}$ may be found. The vector $v_0$ as may be updated as:

$$v_0=(1-\delta)v_0+\delta*e^{-\alpha\delta t}(\gamma_{MIN})*x_{MIN} \qquad \text{Equation (10)}$$

where ( )* denotes a complex conjugation.

In one embodiment, $$v_0 = \frac{v0}{\|v0\|}$$

may be set. The steps provided above of the vector algorithm may be repeated until t=T. The vector algorithm may be adapted to sets of matrices as follows to implement the method 600 described in FIG. 6. A detailed description of a matrix algorithm is provided below.

In one embodiment, a given set of matrices ($X=[X_1 \ X_2 \ldots X_N]$) is provided, where each $X_n$ is a square d×d matrix. In one embodiment, the matrix algorithm starts from a matrix $$V_0 = \frac{1}{N}\sum_{n=1}^{N} V_n,$$

the mean of the vectors in question, and a number of iterations, T. Each column of $V_0$ may be scaled by its Euclidean norm. In addition, constants $\alpha$ and $\delta$ may be defined, such that $0<\delta\ll 1$, and $0<\alpha<1$.

For $\tau=1:T$, the matrix $\Gamma=V_0^H X=[V_0^H \ X_1 \ V_0^H X_2 \ldots V_0^H X_N]=[\Gamma_1 \ \Gamma_2 \ldots \Gamma_N]$ may be formed, which represents the cross-correlation of $V_0$ with each matrix $X_n$. The k and the $\Gamma_k$ from $[\Gamma_1 \ \Gamma_2 \ldots \Gamma_N]$ may be found such that $\Gamma_k$ has minimum Frobenius norm and, $\|\Gamma_k\|^2_F \rightarrow \Gamma_{MIN}$, and $X_k \rightarrow X_{MIN}$ may be set that corresponds to the index; i.e., for the same k. The matrix $V_0$ may be updated as:

$$V_0 = (1-\delta)V_0 + \delta e^{-\alpha\Delta t}(\Gamma_{MIN})^* X_{MIN} \qquad \text{Equation (11)}$$

Each column of $V_0$ may be scaled by its Euclidean norm. The steps of the matrix algorithm may be repeated until $\tau=T$.

Convergence of the matrix algorithm is effective for small enough choices of the constant $\delta$ and appropriate choices of $\alpha$. This is due to the fact that iterated outputs of the matrix algorithm move on the manifold defined by the vectors/matrices in question.

Figure 7:
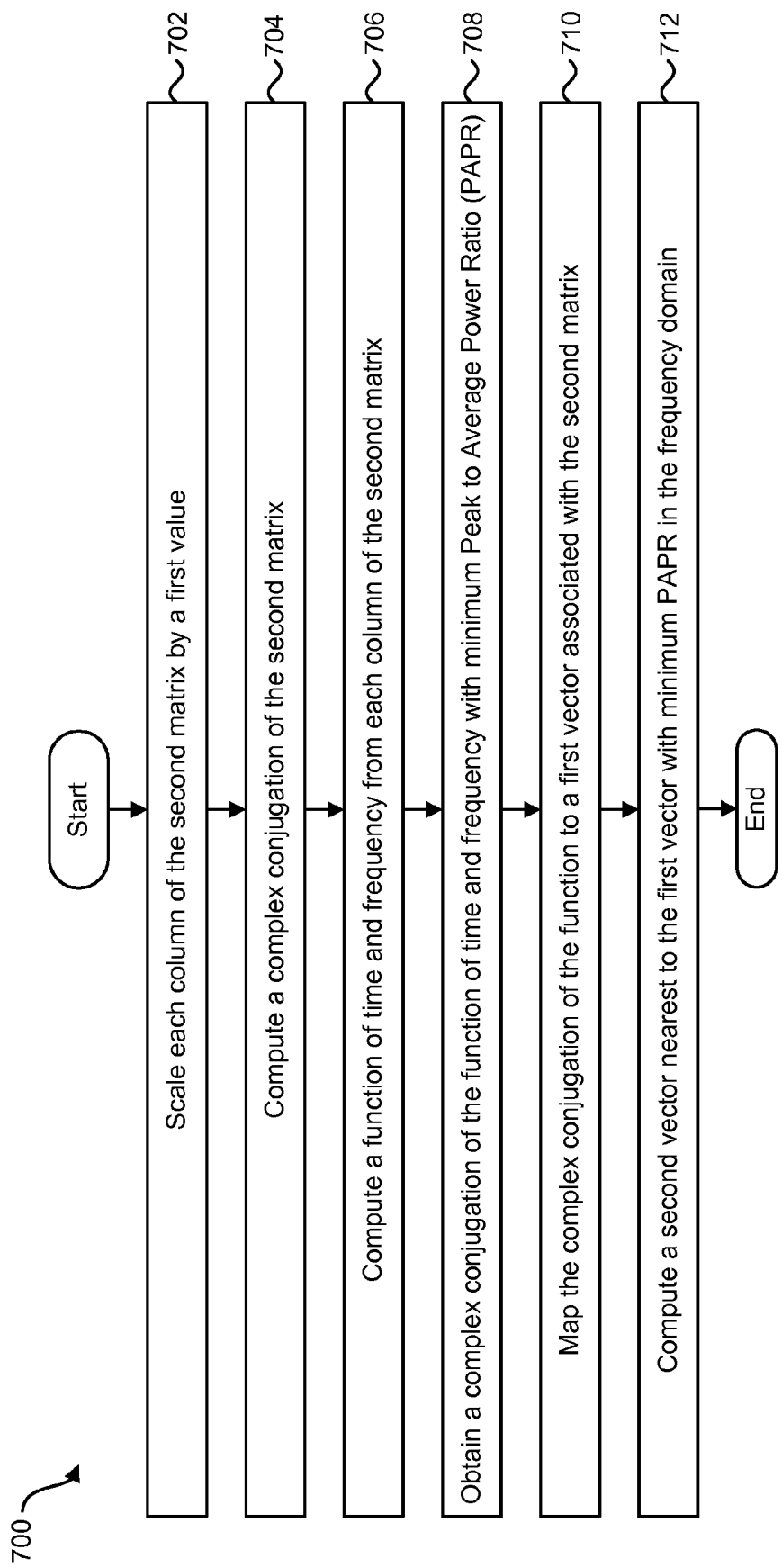
FIG. 7 is a flow diagram illustrating a further embodiment of a method that may be utilized to design a reference signal.

However, further steps may ensure that the resulting vector still retain desirable PAPR properties. In one embodiment, the matrices are circulant matrices. As such, FIG. 7 provides a flow diagram of one embodiment of a method 700 for calculating vectors with minimum PAPR using the matrix algorithm.

In one embodiment, each column of the second matrix (previously mentioned in FIG. 6) is scaled 702 by a first value. A complex conjugation of the second matrix may be computed 704. In addition, a function of time and frequency may be computed 706 from each column of the second matrix. In one embodiment, a complex conjugation of the function of time and frequency may be obtained 708 with a minimum PAPR. The complex conjugation of the function may be mapped 710 to a first vector associated with the second matrix. A second vector nearest to the first vector may be computed 712 with minimum PAPR in the frequency domain.

Below is one embodiment of a more detailed description of the method 700 described in FIG. 7. In one embodiment, $V_0^*$ is computed by taking, for each column of $V_0$, e.g., $v_m$ and computing s(t) as:

$$s(t) = \sum_{k=0}^{d-1}\sum_{u=0}^{d-1} v_{u,m} \cdot e^{-j\frac{2\pi uk}{d}} \cdot e^{j\frac{2\pi k}{T_R}t} \qquad \text{Equation (12)}$$

where $v_{u,m}$ is the u-th component of $v_m$. In one embodiment, the s*(t) is found with minimum PAPR according to an algorithm for designing structured tight frames via an alternating projection method. One such example of this algorithm may be found in section VI of the reference "J. A. Tropp, I. S. Dhillon, and R. W. Heath Jr., 'Designing Structured Tight Frames Via an Alternating Projection Method,' *IEEE Trans. Information Theory*, VOL. 51, No. 1, January 2005, pp. 188-209."

The inverse transforms may be computed that map s*(t) into $v_{m, Time}$ by taking the inverses of the equation that generates s(t). The vector nearest to $v_{m, Time}$* with minimum PAPR in the frequency domain may be computed by using the algorithm for designing structured tight frames via an alternating projection method. The algorithm for designing structured tight frames via an alternating projection method may be applied to the discrete Fourier Transform of $v_{m, Time}$ and the resultant vector may be assigned to $v_m$. In one embodiment, the resulting PAPR minimized vector is assigned to $v_m$. In other words, the reference signal is the resultant vector assigned to $v_m$. The reference signal may be transmitted from a mobile station to a base station.

Another embodiment of the algorithm of the present systems and methods performs the PAPR optimization at the end of the algorithm, after clustering. However, it may increase the effectiveness of the algorithm to embed the algorithm into the clustering process itself as it has been observed that PAPR optimization outside of the clustering process is injurious to minimizing the cross-correlation between elements in the output frame.

Using the results described above, the algorithm of the present systems and methods is now described. Let S=the total number of iterations (a given input), and an input frame Y which includes M d×d matrices. For an initial training set, N matrices may be chosen from Y→W. They may be chosen at random without replacement from Y (using one or multiple random trials to obtain the minimum average cross-correlation over that set of trials), or they may be chosen to be those N matrices that have least cross-correlation with the matrices in Y by examining the Gram matrix of Y (i.e., the Gram matrix being $Y^H Y$) and choosing those matrices for which the magnitude of the Frobenius norm of d×d sub-matrices corresponding to blocks of $Y^H Y$ is a minimum. This can be done, for example by summing the Frobenius norms of each d×d sub-blocks of the Gram matrix in each set of d rows, going d rows at a time, and taking only those N sub-matrices corresponding rows for which the sum is minimum.

For s=1 to S, the optimal partition given W is determined by Equation (1) provided above. For each $W_k \in W$, the matrix algorithm previously described may be performed with PAPR minimization to get the best representative with minimum PAPR. If s≠S, the steps may be repeated until s=S.

Figure 8:
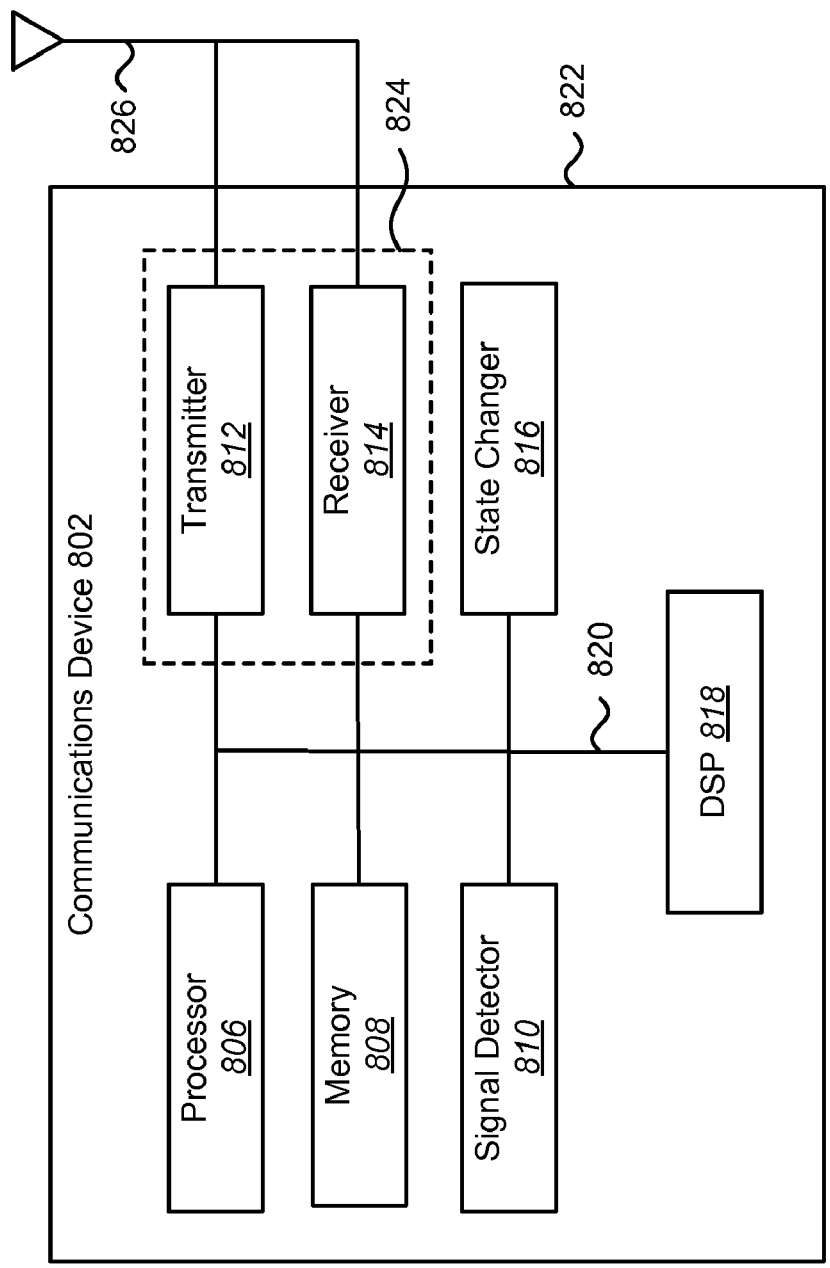
FIG. 8 illustrates various components that may be utilized in a communications device.

FIG. 8 illustrates various components that may be utilized in a communications device 802. The methods herein may be implemented by a communications device 802. The communications device 802 may include any type of communications device such as a mobile station, a cell phone, an access terminal, user equipment, a base station transceiver, a base station controller, etc. The communications device 802 includes a processor 806 which controls operation of the communications device 802. The processor 806 may also be referred to as a CPU. Memory 808, which may include both read-only memory (ROM) and random access memory (RAM), provides instructions and data to the processor 806. A portion of the memory 808 may also include non-volatile random access memory (NVRAM).

The communications device 802 may also include a housing 822 that contains a transmitter 812 and a receiver 814 to allow transmission and reception of data. The transmitter 812 and receiver 814 may be combined into a transceiver 824. An antenna 826 is attached to the housing 822 and electrically coupled to the transceiver 824. Additional antennas (not shown) may also be used.

The communications device 802 may also include a signal detector 810 used to detect and quantify the level of signals received by the transceiver 824. The signal detector 810 detects such signals as total energy, pilot energy, power spectral density, and other signals.

A state changer 816 controls the state of the communications device 802 based on a current state and additional signals received by the transceiver 824 and detected by the signal detector 810. The communications device 802 may be capable of operating in any one of a number of states.

The various components of the communications device 802 are coupled together by a bus system 820 which may include a power bus, a control signal bus, and a status signal bus in addition to a data bus. However, for the sake of clarity, the various buses are illustrated in FIG. 8 as the bus system 820. The communications device 802 may also include a digital signal processor (DSP) 818 for use in processing signals. The communications device 802 illustrated in FIG. 8 is a functional block diagram rather than a listing of specific components.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for designing a reference signal to be transmitted in a multiplexed cellular system, comprising:
   selecting a first set of matrices that comprises a plurality of matrices;
   determining, by a processor, an optimal partition of the first set of matrices;
   forming a third matrix by a processor, wherein the third matrix represents a cross-correlation of a second matrix and each of the plurality of first matrices;
   setting a minimum corresponding to the first set of matrices;
   updating the second matrix using the minimum corresponding to the first set of matrices; and
   scaling each column of the second matrix by a first value.

2. The method of claim 1, further comprising:
   computing a complex conjugation of the second matrix;
   computing a function from each column of the second matrix;
   obtaining a complex conjugation of the function with minimum Peak to Average Power Ratio (PAPR);
   mapping the complex conjugation of the function to a first vector associated with the second matrix; and
   computing a second vector nearest to the first vector with minimum PAPR in the frequency domain.

3. The method of claim 1, further comprising using clustering algorithms to minimize cross-correlation for matrices comprising sub-matrices of Constant Amplitude Zero Autocorrelation (CAZAC) sequences.

4. The method of claim 1, further comprising using a matrix metric based on a magnitude of a normalized cross-correlation.

5. The method of claim 1, further comprising using initial conditions that are based on the Frobenius norm of d×d sub-matrices of the Gram matrix of a set of initial blocks of sequences.

6. The method of claim 5, further comprising determining an initial representation of a set of sequences which can be sub-divided into subsets.

7. The method of claim 6, wherein the subsets are CAZAC sequences.

8. The method of claim 5, further comprising using the initial conditions to design a set of reference signals for transmission of uplink demodulation reference signals.

9. The method of claim 1, further comprising using initial conditions that are based on choosing a series of random subsets of a training set and choosing the initial set of matrices from the series of random subsets that has minimum average cross-correlation.

10. The method of claim 1, further comprising optimizing PAPR in time and frequency domains.

11. The method of claim 1, wherein each column of the second matrix is scaled by its Euclidean norm.

12. A communications device that is configured to design a reference signal to be transmitted in a multiplexed cellular system, the communications device comprising:
   a processor;
   memory in electronic communication with the processor;
   instructions stored in the memory, the instructions being executable to:
      select a first set of matrices that comprises a plurality of matrices;
      determine an optimal partition of the first set of matrices;
      form a third matrix, wherein the third matrix represents a cross-correlation of a second matrix and each of the plurality of first matrices;
      set a minimum corresponding to the first set of matrices;
      update the second matrix using the minimum corresponding to the first set of matrices; and
      scale each column of the second matrix by a first value.

13. The communications device of claim 12, wherein the instructions are further executable to:
   compute a complex conjugation of the second matrix;
   compute a function from each column of the second matrix;
   obtain a complex conjugation of the function with minimum Peak to Average Power Ratio (PAPR);
   map the complex conjugation of the function to a first vector associated with the second matrix; and
   compute a second vector nearest to the first vector with minimum PAPR in the frequency domain.

14. The communications device of claim 12, wherein the instructions are further executable to use clustering algorithms to minimize cross-correlation for matrices comprising sub-matrices of Constant Amplitude Zero Autocorrelation (CAZAC) sequences.

15. The communications device of claim 12, wherein the instructions are further executable to use a matrix metric based on a magnitude of a normalized cross-correlation.

16. The communications device of claim 12, wherein the instructions are further executable to use initial conditions that are based on the Frobenius norm of d×d sub-matrices of the Gram matrix of a set of initial blocks of sequences.

17. The communications device of claim 16, wherein the instructions are further executable to determine an initial representation of a set of sequences which can be sub-divided into subsets.

18. The communications device of claim 17, wherein the subsets are CAZAC sequences.

19. The communications device of claim 16, wherein the instructions are further executable to use the initial conditions to design a set of reference signals for transmission of uplink demodulation reference signals.

20. The communications device of claim 12, wherein the communications device is a mobile cellular device.

21. A computer-readable medium comprising executable instructions to perform the actions of:
   selecting a first set of matrices that comprises a plurality of matrices;
   determining an optimal partition of the first set of matrices;
   forming a third matrix, wherein the third matrix represents a cross-correlation of a second matrix and each of the plurality of first matrices;
   setting a minimum corresponding to the first set of matrices;
   updating the second matrix using the minimum corresponding to the first set of matrices; and
   scaling each column of the second matrix by a first value.

* * * * *